United States Patent [19]

Reck et al.

[11] 3,852,340

[45] *Dec. 3, 1974

[54] PLANT HORMONE CARBOXYLIC ACID SALTS OF ALIPHATIC POLYAMINES

[75] Inventors: Richard A. Reck, Hinsdale; Walter W. Abramitis, Downers Grove, both of Ill.

[73] Assignee: Akzona Incorporated, Ashville, N.C.

[ * ] Notice: The portion of the term of this patent subsequent to Aug. 8, 1989, has been disclaimed.

[22] Filed: Apr. 21, 1970

[21] Appl. No.: 30,608

Related U.S. Application Data

[63] Continuation-in-part of Ser. No. 581,725, Sept. 26, 1966, Pat. No. 3,683,010, which is a continuation-in-part of Ser. No. 300,108, Aug. 5, 1963, abandoned.

[52] U.S. Cl...... 260/501.16, 260/319.1, 260/442 R, 260/501.11, 260/501.2, 260/501.17, 71/96, 71/97, 71/113, 71/115, 71/116, 71/117
[51] Int. Cl............................................ C07c 87/14
[58] Field of Search....... 260/501.16, 501.17, 501.2, 260/319.1, 501.11; 71/114, 115, 116, 117

[56] References Cited

UNITED STATES PATENTS

| | | | |
|---|---|---|---|
| 2,914,557 | 11/1959 | Oxford | 260/501.2 |
| 6,609,071 | 12/1966 | NL | |

FOREIGN PATENTS OR APPLICATIONS

| | | | |
|---|---|---|---|
| 1,402,696 | 5/1965 | France | 260/501.16 |
| 222,673 | 8/1962 | Austria | |

OTHER PUBLICATIONS

Oesterreichische Mineraloelverwaltung A.G., Chemical Abstracts, vol. 57, Col. 10281f, (1962).

*Primary Examiner*—Bernard Helfin
*Assistant Examiner*—Michael W. Glynn
*Attorney, Agent, or Firm*—Francis W. Young; Jack H. Hall

[57] ABSTRACT

Plant hormone carboxylic acid salts of certain aliphatic diamines, triamines and tetraamines having at least 6 carbon atoms in an aliphatic radical thereof, useful as herbicidal agents.

8 Claims, No Drawings

PLANT HORMONE CARBOXYLIC ACID SALTS OF ALIPHATIC POLYAMINES

CROSS-REFERENCE TO RELATED APPLICATION

This application is a continuation-in-part of copending application Ser. No. 581,725, filed Sept. 26, 1966 now U.S. Pat. No. 3,683,010 which is a continuation-in-part of Ser. No. 300,108, filed Aug. 5, 1963, now abandoned.

Plant hormone carboxylic acids are believed to kill certain vegetation by stimulating the plants to excessive growth while having no unusual stimulating effect upon other vegetation. the use of such acids with other compounds, including aliphatic amines, has been found effective in controlling many types of weeds and other plants. One difficulty, however, has been the tendency for the product to volatilize in air currents and to be applied to plants which are not intended to be destroyed. For example, it is common to apply the herbicide composition alongside roadways and adjoining crops, such as cotton, vegetable plants, etc., which must be protected from the action of the composition. Unfortunately, the herbicide composition can become airborne under the circumstances of spraying or other application, and serious damage to the beneficial plants is caused.

We have discovered that by reacting certain polyamines having at least 6 carbon atoms in an aliphatic radical with a plant hormone carboxylic acid, thus forming a salt, a highly effective herbicide, having substantially no tendency to volatilize in air currents, is obtained, thus permitting the composition to be sprayed all about a plant to destroy the weeds, etc., without injury to the plant. Not only does the composition become non-volatile so that it can be safely applied by spraying along a marginal area without danger of drifting, but also the composition has enhanced weed-killing values in providing better root penetration and slow-acting destruction.

A primary object of the invention, therefore, is to provide plant hormone carboxylic acid salts of higher aliphatic diamines, triamines and tetraamines which produce the above-described new results.

A further object is to provide certain diamine, triamine and tetraamine salts of herbicidal acids which are more oil-soluble and water soluble than previously available amine salts of herbicidal acids and which provide a heavier molecule composition having little tendency to drift with air currents when applied by spraying.

A still further object is to provide a polyamine salt herbicidal composition having unique properties enabling it to be applied around plants for the destruction of weeds without injuring the desired plant. Other specific objects and advantages will appear as the specification proceeds.

In one embodiment of our invention, an aliphatic polyamine having preferably from 6 to 23 carbon atoms in an aliphatic radical thereof is reacted with a plant hormone carboxylic acid to form a salt of the two substances. The resulting composition is oil soluble and can be applied in organic solvents, such as kerosene, xylene, aromatic oils, acetone, diacetone, isopropanol, etc. If desired, an oil-in-water emulsion may be formed and the composition applied in such an emulsion. The application can be by spraying and, by way of specific example, it can be stated that the spray can be applied about a peony bush for destroying the weeds about the bush without contacting and injuring the peony plant.

Suitable aliphatic diamines include aliphatic diamines having 6 to 23 carbon atoms in an aliphatic radical thereof. Preferred diamines include those (I). wherein the nitrogens are connected by trimethylene groups having attached to one nitrogen a radical selected from the group consisting of alkenyl, alkyl and aryl-substituted alkyl wherein said alkenyl and alkyl group has from 6 to 18 carbon atoms; provided the remaining groups attached to the nitrogens are selected from the group consisting of hydrogen methyl, ethyl and addition products of alkylene oxide selected from the group consisting of ethylene oxide and propylene oxide in amounts of from about 1 to 20 moles of alkylene oxide per mole of amine; and (II.) diamines selected from the group consisting of compounds having the formula

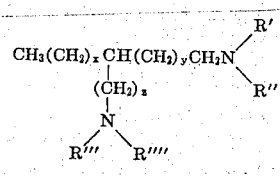

wherein $x$ is 0 to 15, $y$ is 0 to 15, provided that $x$ plus $y$ is 3 to 15, and $z$ is 0 to 2, $R'$, $R''$, $R'''$, and $R''''$ are each selected from the group consisting of hydrogen, methyl, ethyl and addition products of alkylene oxide such as ethylene oxide and propylene oxide in the amounts of from 1 to 20 moles of alkylene oxide per mole of amine. Preferred diamines within the above formula are aminoundecylamine, aminostearylamine and aminomethylstearylamine wherein the remaining groups attached to the nitrogens are selected from the group consisting of hydrogen, methyl, ethyl and addition products of alkylene oxide selected from the group consisting of ethylene oxide and propylene oxide in amounts of from about 1 to 20 moles of alkylene oxide per mole of amine.

The diamines may be obtained from fatty acids of natural fats or oils, such as tallow, soybean oil, cottonseed oil, coconut oil, or from fractions of these natural acid mixtures, saturated or unsaturated. Also, the diamines may be obtained from sources such as unsaturated acids and olefins. The long chain hydrocarbon radical may be straight chain or branched chain and saturated or unsaturated. The diamine may be alkoxylated with a compound such as ethylene or propylene oxide, either adding a β-hydroxyalkyl group or a higher adduct thereof, preferably from about 1 to 20 moles of alkylene oxide per mole of diamine. Especially preferred alkoxylation involves reaction of 1 to 6 moles of alkylene oxide per mole of diamine.

Alkoxylated amines are well known in the art to be produced by the reaction of an alkylene oxide such as ethylene oxide or propylene oxide with a primary or secondary amine. The use of several moles of alkylene oxide per mole of amine results in an alkylene oxide adduct having repeated ether linkages with a terminal hydroxy function. The random growth of an alkylene oxide adduct by addition of alkylene oxide to hydroxyl functions is well known in the art. Therefore, when more than the number of moles of alkylene oxide than free hydrogens available on nitrogen atoms are reacted with a polyamine a mixture of alkylene oxide adduct chain lengths is formed. the product thus formed is identified by the sum of the alkylene oxide units or the moles of alkylene oxide reacted with a mole of amine. Amines containing the beta hydroxyethyl function attached directly to the nitrogen atom have been found especially suitable for use in this invention.

Preferred aliphatic polyamines include amines having an alkyl, alkenyl, or arylalkyl group containing from about 6 to 18 carbon atoms in the hydrocarbon chain. Suitable alkyl groups include hexyl, heptyl, octyl, nonyl, decyl, undecyl, dodecyl, tridecyl, tetradecyl, pentadecyl, hexadecyl, heptadecyl, octadecyl, branched chain alkyl groups such as secondary alkyl including sec-alkyl $C_{(7-9)}$, sec-alkyl $C_{(9-10)}$, sec-alkyl $C_{(11-14)}$, and sec-alkyl $C_{(15-18)}$. One preferred subclass of secondary alkyl groups has the formula

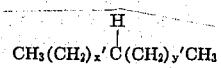

wherein $x'$ and $y'$ are integers of 0 to 15 and the sum of $x'$ and $y'$ is an integer of 3 to 15. Other branched chain configurations are also suitable. Suitable alkenyl groups include hexenyl, heptenyl, octenyl, nonenyl, decenyl, undecenyl, dodecenyl, tridecenyl, tetradecenyl, pentadecenyl, hexadecenyl, heptadecenyl, octadecenyl and their branched chain derivatives. Mixtures of alkoxylated amines having both saturated and unsaturated groups such as derived from coconut oil, tallow and other natural sources may be used.

Arylalkyl groups having the formula:

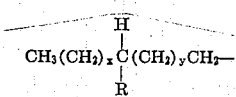

wherein $x$ and $y$ are integers of 0 to 15 and the sum of $x$ and $y$ is an integer 3 to 15, R is an aryl group selected from phenyl, naphthyl, and phenyl substituted with from 1 to 2 groups selected from methyl, hydroxy, methoxy, and phenoxy are suitable. In a preferred subclass of compounds, $x$ and $y$ are integers from 0 to 15 and the sum of $x$ and $y$ is 15, such as N-9(10)phenylstearyl amine.

Other polyamines which may be utilized in this invention are triamines and tetraamines. Preferable triamines are produced by mono-cyanoethylation of any of the above-mentioned diamines followed by reduction of the nitrile group to an amine. These preparations are well known in the art. The resultant triamine is the γ-aminopropyl derivative of the diamine. In instances of diamines having two primary amino functions, the γ-aminopropyl group may be added to either amino function. In the case of diamines having one secondary and one primary amino function, the γ-aminopropyl group adds to the primary amino function making a chain structure. All of the above disclosed diamines are suitable for formation of the triamine for use in our invention.

Likewise, tetraamines may be produced by dicyanoethylation of diamines or by monocyanoethylation of any of the previously mentioned triamines. Especially preferred tetraamines are N-γaminopropyl, N'-γaminopropyl aminostearylamine, aminomethylstearylamine, aminoundecylamine and aminomethylundecylamine. All of the above disclosed diamines and triamines are suitable for formation of the tetraamine for use in our invention.

The plant hormones occur generally in the form of carboxylic acids. Examples are 2,4-dichlorophenoxyacetic acid; 2,4,5-trichlorophenoxyacetic acid; methylchlorophenoxyacetic acid; chlorinated benzoic acid; dichloropropionic acid; β-indolylacetic acid; α-naphthaleneacetic acid; indolylbutyric acid; indolylpropionic acid; phenylacetic acid; fluoroacetic acid; 2,5-dichloro-3-nitrobenzoic acid; 3-amino-2,5-dichloro benzoic acid, and 3,6-endoxohexahydrophthalic acid.

The reaction between the amine and the carboxylic acid may be carried out in any suitable manner. For example, the two substances may be mixed in a solvent and warmed until a homogeneous solution is obtained, and then cooled until precipitation of the salt is complete, after which it may be filtered and dried.

The resulting salts are viscous liquids which may be then dissolved in organic solvents or emulsified to form oil-in-water emulsions, and the composition applied by spraying or by other suitable means to the area about the plants, etc.

The following specific examples are illustrative of our invention.

EXAMPLE I

Various plant hormone carboxylic acid salts of differing molecular configurations of diamines, triamines and tetraamines were prepared by mixing stoichiometric proportions of polymamine and plant hormone carboxylic acid in benzene. The mixture was warmed to about 75° to 100°C until complete solution was obtained, agitated, then cooled, filtered and dried. The following products were prepared in this manner.

Dimethyl arsenic acid di salt of N-tallow trimethylenediamine (ethoxylated with 3 moles ethylene oxide).

2,5-dichloro-3-nitrobenzoic acid mono salt of aminomethylstearylamine.

2,4-dichlorophenoxyacetic acid tri salt of N-tallow-N'-(γ-aminopropyl)-trimethylenediamine.

3-amino-2,5-dichlorobenzoic acid salt of aminomethylstearylamine.

3,6-endoxohexahydrophthalic acid mono and di salts of aminomethylstearylamine.

2,4-dichlorophenoxyacetic acid mono and di salts of aminomethylstearylamine.

3-amino-2,5-dichlorobenzoic acid di salt of N-tallow trimethylenediamine (ethoxylated with 3 moles ethylene oxide).

2,5-dichloro-3-nitrobenzoic acid di salt of N-tallow trimethylenediamine (ethoxylated with 3 moles ethylene oxide).

2,4-dichlorophenoxyacetic acid mono and di salts of N-(xylylstearyl) trimethylenediamine.

3,6-endoxohexahydrophthalic acid mono and di salts of N-(xylylstearyl) trimethylenediamine.

3,6,-endoxohexahydrophthalic acid mono and di salts of N,N,N',N' tetramethyl aminomethylstearylamine.

2,4-dichlorophenoxyacetic acid mono and di salts of N,N,N',N' tetramethyl aminomethylstearylamine.

3,6-endoxohexahydrophthalic acid mono and di salts of N-(phenylbehenyl) trimethylenediamine.

2,4-dichlorophenoxyacetic acid mono and di salts of N-(phenylbehenyl) trimethylenediamine.

2,4-dichlorophenoxyacetic acid tri salt of N-oleyl-N'-(γ-aminopropyl)-trimethylenediamine.

α,α-dichloropropionic acid mono and di salts of N-($C_{15}$-$C_{20}$ sec-alkyl) trimethylenediamine (ethoxylated with 3 moles ethylene oxide).

α,α-dichloropropionic acid mono and di salts of N-tallow trimethylenediamine (ethoxylated with 10 moles ethylene oxide).

3,6-endoxohexahydrophthalic acid mono and di salts of N,N,N',N' tetraethyl aminostearylamine.

2,4-dichlorophenoxyacetic acid mono and di salts of N-tallow trimethylenediamine (propoxylated with 10 moles propylene oxide).

EXAMPLE II

Diamine salts of plant hormone carboxylic acids were applied to various crops and weeds to ascertain their selective herbicidal action. Table I shows the results of pre-emergence application of chemical at the indicated application rate and observed 20 days post application.

It should be noted that the 2,4-dichlorophenoxyacetic acid mono salt of both aminostearylamine and phenyl-stearyl trimethylenediamine of this invention afford complete safety to soybeans while effectively controlling weeds, while the 2,4-dichlorophenoxyacetic acid mono salt of N-tallow trimethylenediamine kills the soybeans while not effectively controlling weeds at the same application rate.

TABLE I

| Chemical | Pounds Per Acre | Injury Rating* | | | | | | | | Weeds | |
|---|---|---|---|---|---|---|---|---|---|---|---|
| | | Corn | Soybean | Cotton | Sugar Beet | Spinach | Wheat | String Bean | ucumber | Broadleaf | Grass |
| 2,5-dichloro-3-nitrobenzoic acid mono salt of aminomethylstearylamine | 1<br>2<br>4 | 0<br>0<br>0 | | 0<br>1-D | 1<br>2 | 9<br>9 | 0<br>5 | 5<br>5 | 8-D<br>5-D | 10<br>9<br>10 | 10<br>4<br>2 |
| 3-amino-2,5-dichlorobenzoic acid di salt of N-sec-tridecyl trimethylenediamine (ethoxylated with 3 moles ethylene oxide) | 1<br>2<br>4 | 0<br>0 | 9<br>5<br>8 | 2<br>0 | 0<br>1 | 0<br>3 | 2<br>0 | 4-D<br>2 | 0<br>3 | 10<br>9<br>2 | 10<br>7<br>4 |
| 2,4-dichlorophenoxyacetic acid mono salt of aminomethylstearylamine | 0.75<br>2 | 0<br>0 | 1<br>0 | 0<br>0 | 0<br>1 | 0<br>0 | 0<br>0 | | | 9<br>8 | 6<br>5 |
| 2,4-dichlorophenoxyacetic acid di salt of aminomethylstearylamine | 0.75<br>2 | 0<br>0 | 3-D<br>2 | 1<br>0 | 4<br>0 | 1-D<br>3 | | | | 9<br>10 | 3<br>5 |
| 2,4-dichlorophenoxyacetic acid mono salt of aminostearylamine | 1.0<br>0.5 | 0<br>0 | 0<br>0 | | | | 0<br>0 | | | 10<br>9 | |
| 2,4-dichlorophenoxyacetic acid mono salt of N-phenylstearyl trimethylenediamine | 1.0<br>0.5 | 0<br>0 | 0<br>0 | | | | 0<br>0 | | | 10<br>9 | |
| 2,4-dichlorophenoxy acetic acid mono salt of N-tallow trimethylenediamine | 1.0<br>0.5 | 3<br>0 | 10<br>10 | | | | 0<br>0 | | | 7<br>8 | |

*Rating - 0=No injury; 1=Slight injury; 5=Moderate injury; 9=Very heavy injury; 10=Plants dead; D=Dwarfed

EXAMPLE III

Water emulsions of the noted plant hormone carboxylic acid salts of diamines were sprayed on flats seeded with soybeans, various broadleaf weeds, and grass. The herbicides were applied at the indicated rate of active herbicidal component in pounds per acre. Eight days following spray application the number of germinating soybean plants and the number of soybean plants showing any injury was noted. Twelve days following spray application the percent weed control was noted. Twenty soybean seeds were planted in each flat. Table II shows the good weed and grass control obtained with very low injury to the desired soybean crop.

TABLE II

| Chemical | RATE Lbs/Acre | EIGHT DAYS | | % Weed Control 12 DAYS | |
|---|---|---|---|---|---|
| | | Number Germinated | Number Injured | Broadleaf Weeds | Grass |
| 2,4-dichlorophenoxyacetic acid mono salt of N-phenyl-stearyl trimethylenediamine | 1.0<br>0.5 | 20<br>20 | 2<br>3 | 99<br>70 | 95<br>88 |
| 2,4-dichlorophenoxyacetic acid mono salt of 9(10) amine stearylamine | 1.0<br>0.5 | 17<br>19 | 0<br>1 | 90<br>70 | 99<br>98 |

EXAMPLE IV

The 2,4-dichlorophenoxyacetic acid mono salts and di salts of aminomethylstearylamine were prepared and applied by a water spray to flats seeded with alfalfa, crabgrass and pigweed. The herbicide was applied at the rate of 0.5 lbs. of active herbicide per acre. The flats were observed after 18 days and it was noted that the desired alfalfa crop emerged at a high rate while the undesired weeds were effectively killed. The results are shown in Table III.

TABLE III

|  | % Kill-Weeds | | % Emergence |
| --- | --- | --- | --- |
|  | Crabgrass | Pigweed | Alfalfa |
| Mono-Salt | 75 | 90 | 100 |
| Di-Salt | 75 | 90 | 90 |

EXAMPLE V

Diamine salts of plant hormone carboxylic acids were applied in aqueous sprays post emergence to different crops and weeds to illustrate their effective and selective herbicidal action. Table IV shows the results of post-emergence application of specified chemicals observed 7 days after application of the herbicide.

TABLE IV

| Chemical | Pounds Per Acre | Injury Rating | | Weeds | |
| --- | --- | --- | --- | --- | --- |
|  |  | Corn | Wheat | Broad Leaf | Grass |
| 2,4-dichlorophenoxyacetic acid di salt of aminomethyl-stearyl amine | 0.5 | 0 | 0.5 | 8 | 0 |
|  | 1 | 2 | 0.5 | 9.5 | 0 |
| 2,4-dichlorophenoxy acetic acid mono salt of aminomethyl stearyl amine | 0.5 | 0 | 1 | 9 | 0 |
|  | 1 | 3 | 1 | 10 | 0 |

EXAMPLE VI

One mole of N,N'-di(γ-aminopropyl)-aminomethylstearylamine (50% active in isopropanol) was warmed to about 70°C and 4 moles of 2,4-dichlorophenoxyacetic acid were added slowly. During this addition the temperature was maintained at about 70° to 80° C and agitation was provided by a nitrogen sparger until the reaction was complete. The product was the 2,4-dichlorophenoxyacetic acid tetra salt of N,N'-di(γ-aminopropyl)-aminomethylstearylamine.

This chamical is effective in control of weeds as a selective pre-emergence herbicide.

While all of the plant hormone carboxylic acid salts of aliphatic polyamines of our invention are generally soluble in oils, the compounds of our invention afford the surprising property of controlled increased water solubility. Controlled water solubility is desirable for increased soil penetration and to facilitate plant metabolism of the compounds. Slow controlled water solubility is also desirable to obtain effective and continued aquatic weed control. The alkoxylated polyamines of our invention, such as the ethylene oxide adducts and the propylene oxide adducts, have increased water solubility as compared with their corresponding compounds which have active hydrogens on the amino groups. Specific control water solubility of certain compounds of our invention is shown by the water solubility of 2,4-dichlorophenoxyacetic acid fully neutralized salts of various polyamines. The solubilities were obtained by using tap water having a pH 8.4 and at 25°C.

| Amine Salt | Solubility Per Cent |
| --- | --- |
| N-phenylstearyltrimethylene diamine | 0.0004 |
| N-oleyl trimethylene diamine | 0.0002 |
| N-tallow, N'-γaminopropyl tri-methylene diamine | 0.01 |
| N-γaminopropyl, N'-aminopropyl aminostearylamine | 0.03 |
| N-tallow, N'-γaminopropyl, N''-aminopropyl, trimethylene diamine | 0.06 |
| 9(10)-aminomethyl-stearylamine | 0.07 |

While in the foregoing specification we have set forth illustrative embodiments in considerable detail for the purpose of explaining the invention, it will be understood that such detail or details may be varied widely by those skilled in the art without department from the spirit of our invention.

We claim:

1. A plant hormone carboxylic acid salt of an aliphatic polyamine selected from the group consisting of aminostearylamine, aminomethylstearylamine, aminoundecylamine, and aminomethylundecylamine and γ-aminopropyl derivatives thereof having the following formula:

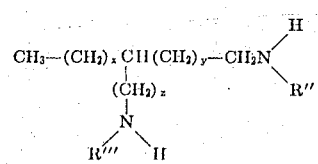

wherein
$x = 0$ to 15
$y = 0$ to 15
$z = 0$ or 1
$x + y = 8$ or 15
$R'''$, $R'' = H$ or γ-aminopropyl said plant hormone carboxylic acid being selected from the group consisting of 2,4-dichlorophenoxyacetic acid; 2,4,5-trichlorophenoxyacetic acid; methylchlorophenoxyacetic acid; chlorinated benzoic acid; dichloropropionic acid; β-indolylacetic acid α-naphthaleneactic acid; indolylbutyric acid; indolylpropionic acid; phenylacetic acid; fluoroacetic acid; 2,5-dichloro-3-nitrobenzoic acid; 3-amino-2,5-dichlorobenzoic acid, and 3,6-endoxohexahydrophthalic acid.

2. A plant hormone carboxylic acid salt of a polyamine of claim 1 wherein said polyamine is a triamine.

3. A plant hormone carboxylic acid salt of a polyamine of claim 1 wherein said polyamine is a tetraamine.

4. A plant hormone carboxylic acid salt of claim 1 wherein the polyamine is aminostearylamine.

5. A plant hormone carboxylic salt of claim 1 wherein the polyamine is aminomethylstearylamine.

6. The plant hormone carboxylic acid salt of claim 5 wherein said carboxylic acid is 2,4-dichlorophenoxyacetic acid.

7. A plant hormone carboxylic acid salt of claim 1 wherein said polyamine is N-γ-aminopropyl, N'-γ-aminopropyl aminostearylamine.

8. A plant hormone carboxylic acid salt of claim 1 wherein said polyamine is N-γ-aminopropyl, N'-γ-aminopropyl aminoundecylamine.

* * * * *